(12) United States Patent
Akamatsu et al.

(10) Patent No.: US 12,346,586 B2
(45) Date of Patent: Jul. 1, 2025

(54) APPARATUSES AND METHODS FOR SHARED ROW AND COLUMN ADDRESS BUSES

(71) Applicant: MICRON TECHNOLOGY, INC., Boise, ID (US)

(72) Inventors: Hiroshi Akamatsu, Atlanta, GA (US); Reuben Pradhan, Atlanta, GA (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 18/480,773

(22) Filed: Oct. 4, 2023

(65) Prior Publication Data

US 2024/0192874 A1 Jun. 13, 2024

Related U.S. Application Data

(60) Provisional application No. 63/387,139, filed on Dec. 13, 2022.

(51) Int. Cl.
*G06F 12/00* (2006.01)
*G06F 3/06* (2006.01)

(52) U.S. Cl.
CPC .............. *G06F 3/064* (2013.01); *G06F 3/061* (2013.01); *G06F 3/0673* (2013.01)

(58) Field of Classification Search
CPC ...... G06F 3/0616; G06F 3/064; G06F 3/0659; G06F 3/0679
See application file for complete search history.

(56) References Cited

U.S. PATENT DOCUMENTS

| | | | |
|---|---|---|---|
| 9,432,298 B1* | 8/2016 | Smith | H04L 49/9057 |
| 9,940,990 B1* | 4/2018 | Willcock | G11C 19/00 |
| 2018/0090185 A1* | 3/2018 | Hossain | G11C 7/1012 |
| 2021/0249067 A1* | 8/2021 | Fujishiro | G11C 7/1087 |

* cited by examiner

*Primary Examiner* — Arvind Talukdar
(74) *Attorney, Agent, or Firm* — Dorsey & Whitney LLP

(57) ABSTRACT

Apparatuses and methods for shared row and column address buses. Row and column addresses are distributed along separate respective global buses in a central logic region of a memory. The row and column addresses are coupled through a shared address bus from the central logic region to a bank logic region. For example the row address may be provided along the shared address bus at a first time and the column address may be provided along the shared address bus at a second time.

19 Claims, 8 Drawing Sheets

800

810 — Providing a Row Address Along a Row Address Bus in a Central Logic Region

820 — Providing the Row Address Along a Shared Address Bus from the Central Logic Region to a Bank Logic Region Responsive to a Row Activation Signal 830 — Providing a Column Address Along a Column Address Bus in the Central Logic Region 840 — Providing the Column Address Along the Shared Bus Responsive to a Read or Write Command

APPARATUSES AND METHODS FOR SHARED ROW AND COLUMN ADDRESS BUSES

CROSS REFERENCE TO RELATED APPLICATION(S)

This application claims the benefit under 35 U.S.C. § 119 of the earlier filing date of U.S. Provisional Application Ser. No. 63/387,139 filed Dec. 13, 2022 the entire contents of which are hereby incorporated by reference in their entirety for any purpose.

BACKGROUND

Information may be stored on memory cells of a memory device. The memory cells may be organized at the intersection of word lines (rows) and bit lines (columns). Memory cells may be accessed based on a row address which specifies the word line, and a column address which specifies the bit line.

The memory array may be subdivided into different banks. Each bank may have associated bank logic which includes the address decoders for that bank as well as other circuits used to access the memory cells of that bank. A command decoder in a central logic region may receive addresses from an external controller, and provide those addresses to the bank logic of the bank which is being accessed. Each bank may receive a relatively large number of signal, power lines, etc. It may be desirable to reduce the number of signal lines between the central region and the bank logic regions.

DETAILED DESCRIPTION

Figure 1:
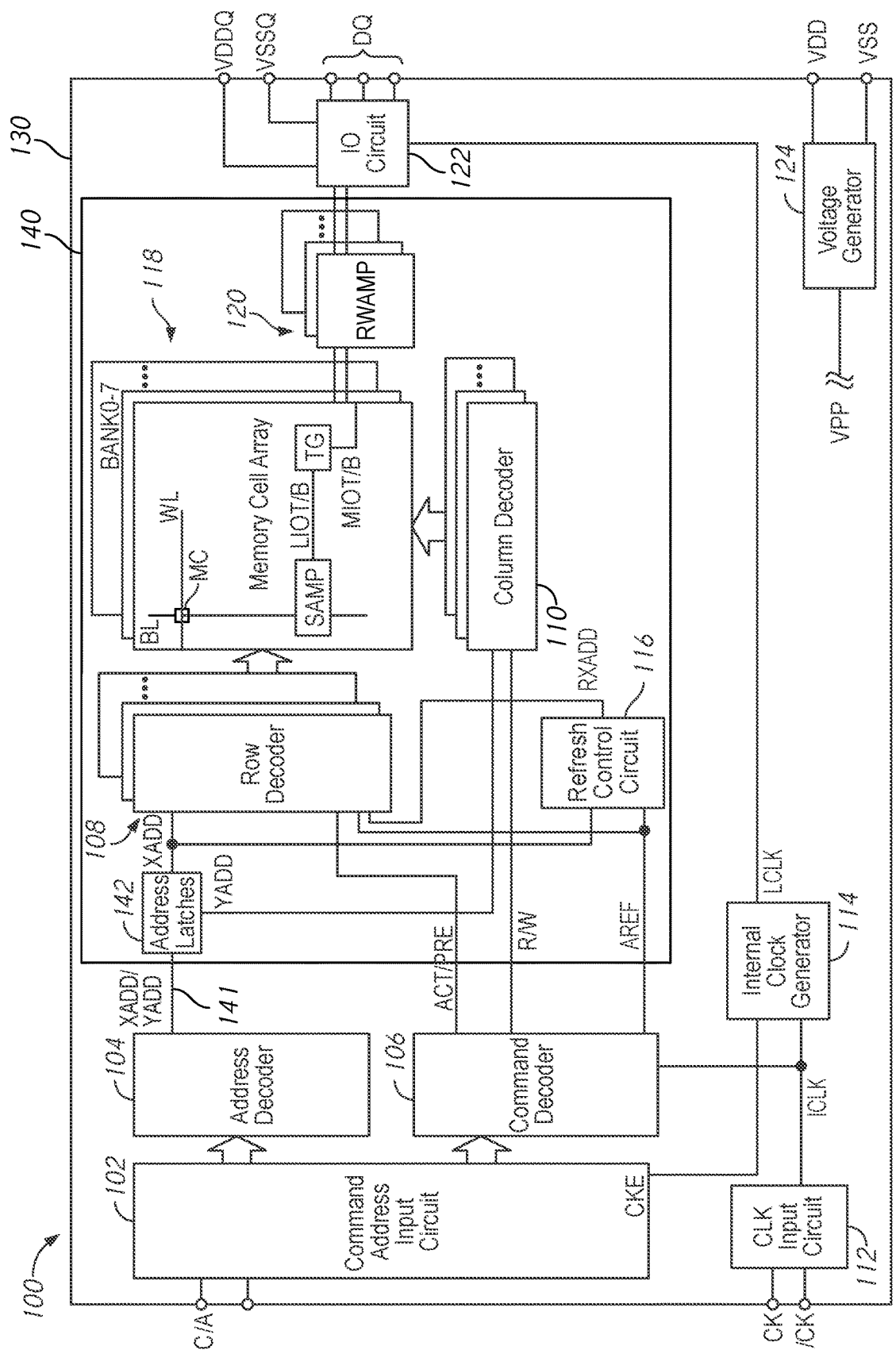
FIG. 1 is a block diagram of a semiconductor device according to an embodiment of the present disclosure.

The following description of certain embodiments is merely exemplary in nature and is in no way intended to limit the scope of the disclosure or its applications or uses. In the following detailed description of embodiments of the present systems and methods, reference is made to the accompanying drawings which form a part hereof, and which are shown by way of illustration specific embodiments in which the described systems and methods may be practiced. These embodiments are described in sufficient detail to enable those skilled in the art to practice presently disclosed systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

Information in a memory array may be accessed by one or more access operations, such as read or write operations. As part of the access operation an external controller provides a row address and a column address along with a command (e.g., a read or write command). A command decoder located in a central logic region of the memory receives the addresses and provides the row address along a row address bus and the column address along a column address bus. Each bank of the memory array has associated central row and column address latches in the central region. Those central latches are coupled to corresponding bank row and column address latches in the bank logic region. The region of the chip which couples the bank logic region to the central logic region may be relatively congested. It may be useful to reduce the number of signal lines which couple the banks to the central region.

The present disclosure is drawn to apparatuses, systems, and methods for shared row and column address buses. The central row and column address latches are coupled to the associated bank row and column address latches by a shared address bus. The shared address bus provides either the row address or the column address over shared signal lines. For example, a multiplexer may provide the row address along the shared address bus at a first time and then provide the column address along the shared address bus at a second time after providing the row address bus. In this way, since the addresses share a bus between the central and bank logic regions, the overall number of signal lines (e.g., the width of the bus) dedicated to providing addresses to the bank may be reduced. The reduction in the layout of the buses passing into the bank logic region may allow for increased flexibility in the layout of a relatively congested region of the memory device. For example, the reduced number of signal lines in the shared bus (as compared to separate buses) may allow more space for other components, such as power lines.

In some example embodiments, the latches and the multiplexer may operate with timing based on the various signals used to operate the memory bank as part of the access operation. For example, the row address may be latched in the central row address latch from the row address bus based on a row activation signal ACT while the column address may be latched in the central column address latch from the column address bus with timing based on an access command R/W (e.g., the read or write command). A multiplexer couples the central row address latch to the shared address bus responsive to the activation signal ACT or couples the central column address latch to the shared address bus responsive to the R/W command.

FIG. 1 is a block diagram of a semiconductor device according an embodiment of the disclosure. The semiconductor device 100 may be a semiconductor memory device, such as a DRAM device. The semiconductor device 100 may be split between components in a 'central logic region' 130 and components in each 'bank logic region' 140. Each bank 118 of the memory array has an associated bank logic region 140 and associated components. The central logic region 130 includes components which send and receive signals on/off the device 100, as well as components which are shared in common between different banks and their associated bank logic 130. In the example diagram of FIG. 1, certain components are shown located in the central logic region 130, while other components are shown as part of each of the bank logic regions 140. The example device 100 of FIG. 1 shows a particular arrangement of components between the central logic region 130 and the bank logic region 140, however other arrangements may be used in other embodiments (e.g., the refresh control circuit 116, the row decoder 108 and/or the column decoder 110 may be in the central logic region 130 in some embodiments).

The semiconductor device 100 includes a memory array 118. The memory array 118 is shown as including a plurality of memory banks, each of which has an associated bank logic region 140. In the embodiment of FIG. 1, the memory array 118 is shown as including eight memory banks BANK0-BANK7 (and therefore eight bank logic regions 140). More or fewer banks (and bank logic regions) may be included in the memory array 118 of other embodiments. Each memory bank includes a plurality of word lines WL, a plurality of bit lines BL, and a plurality of memory cells MC arranged at intersections of the plurality of word lines WL and the plurality of bit line BL. The selection of the word line WL is performed by a row decoder 108 and the selection of the bit lines BL is performed by a column decoder 110, each of which be part of the bank logic region 140 and may be repeated for each bank of the memory array 118. The bit lines BL are coupled to a respective sense amplifier (SAMP) of the memory array 118. Read data from the bit line BL is amplified by the sense amplifier SAMP, and transferred to read/write amplifiers 120 over complementary local data lines (LIOT/B), transfer gate (TG), and complementary main data lines (MIOT/B) which are coupled to a read/write amplifier (RWAMP) 120. Conversely, write data outputted from the RWAMP circuit 120 is transferred to the sense amplifier SAMP over the complementary main data lines MIOT/B, the transfer gate TG, and the complementary local data lines LIOT/B, and written in the memory cell MC coupled to the bit line BL.

The semiconductor device 100 may employ a plurality of external terminals that include command and address (C/A) terminals coupled to a command and address bus to receive commands and addresses, and a CS signal, clock terminals to receive clocks CK and /CK, data terminals DQ to provide data, and power supply terminals to receive power supply potentials VDD, VSS, VDDQ, and VSSQ.

The clock terminals are supplied with external clocks CK and /CK that are provided to an input circuit 112. The external clocks may be complementary. The input circuit 112 generates an internal clock ICLK based on the CK and /CK clocks. The ICLK clock is provided to the command decoder 106 and to an internal clock generator 114. The internal clock generator 114 provides various internal clocks LCLK based on the ICLK clock. The LCLK clocks may be used for timing operation of various internal circuits. For example, the internal data clocks LCLK are provided to the input/output circuit 122 to time operation of circuits included in the input/output circuit 122.

The C/A terminals may be supplied with memory addresses. The memory addresses supplied to the C/A terminals are transferred, via a command/address input circuit 102, to an address decoder 104 of the central logic region 130. The address decoder 104 receives the address and supplies a row address XADD to the row decoder 108 and supplies a column address YADD to the column decoder 110. The bus that couples the addresses from the central logic region 130 to the bank logic region 140 of the specified bank may be a shared address bus 141 which provides either the row address XADD or the column address YADD. Address latches 142 of the bank logic region 140 may receive the addresses along the shared bus 141 and distribute the row and column address along internal buses to the row decoder 108 and column decoder 110 respectively. For example, a bank row address latch in the address latches 142 may be active at a first time to latch a row address off the shared bus 141 and a bank column address latch in the address latches 142 may be active at a second time to latch a column address off the shared bus 141. As explained in more detail herein, the address latches 142 may operate with timing based on various control signals of the memory device 100.

The address decoder 104 may also supply a decoded bank address BADD, which may indicate the bank of the memory array 118 containing the decoded row address XADD and column address YADD. The C/A terminals may be supplied with commands. Examples of commands include timing commands for controlling the timing of various operations, access commands for accessing the memory, such as read commands for performing read operations and write commands for performing write operations, as well as other commands and operations. The access commands may be associated with one or more row address XADD, column address YADD, and bank address BADD to indicate the memory cell(s) to be accessed.

The commands may be provided as internal command signals to a command decoder 106 via the command/address input circuit 102. The command decoder 106 includes circuits to decode the internal command signals to generate various internal signals and commands for performing operations. For example, the command decoder 106 may provide a row command signal such as a row activation and precharge signals ACT and PRE to select a word line and column command signals such as read or write R/W to select a bit line.

The device 100 may receive an access command which is a read command. When a read command is received, and a bank address, a row address and a column address are timely supplied with the read command, read data is read from memory cells in the memory array 118 corresponding to the row address and column address. The read command is received by the command decoder 106, which provides internal commands so that read data from the memory array 118 is provided to the read/write amplifier 120. The read data is received by data latches of the IO circuit 122. The read data is output to outside the device 100 from the data terminals DQ via the input/output circuit 122.

The device 100 may receive an access command which is a write command. When the write command is received, and a bank address, a row address and a column address are timely supplied with the write command, and write data is supplied through the DQ terminals to RWAMP 120. The write data supplied to the data terminals DQ is written to a memory cells in the memory array 118 corresponding to the row address and column address. The write command is received by the command decoder 106, which provides internal commands so that the write data is received by data receivers in the input/output circuit 122. Write clocks may also be provided to the external clock terminals for timing the receipt of the write data by the data receivers of the input/output circuit 122. The write data is supplied via the input/output circuit 122 RWAMP 120.

The device 100 may also receive commands causing it to carry out one or more refresh operations as part of a self-refresh mode. In some embodiments, the self-refresh mode command may be externally issued to the memory device 100. In some embodiments, the self-refresh mode command may be periodically generated by a component of the device. In some embodiments, when an external signal indicates a self-refresh entry command, the refresh signal AREF may also be activated. The refresh signal AREF may be a pulse signal which is activated when the command decoder 106 receives a signal which indicates entry to the self-refresh mode. The refresh signal AREF may be activated once immediately after command input, and thereafter may be cyclically activated at desired internal timing. The refresh signal AREF may be used to control the timing of refresh operations during the self-refresh mode. Thus, refresh operations may continue automatically. A self-refresh exit command may cause the automatic activation of the refresh signal AREF to stop and return to an IDLE state. The refresh signal AREF is supplied to the refresh control circuit 116. The refresh control circuit 116 supplies a refresh row address RXADD to the row decoder 108, which may refresh one or more word lines WL indicated by the refresh row address RXADD.

The power supply terminals are supplied with power supply potentials VDD and VSS. The power supply potentials VDD and VSS are supplied to an internal voltage generator circuit 124. The internal voltage generator circuit 124 generates various internal potentials such as VPP, VOD, VARY, VPERI, and the like based on the power supply potentials VDD and VSS supplied to the power supply terminals.

The power supply terminals are also supplied with power supply potentials VDDQ and VSSQ. The power supply potentials VDDQ and VSSQ are supplied to the input/output circuit 122. The power supply potentials VDDQ and VSSQ supplied to the power supply terminals may be the same potentials as the power supply potentials VDD and VSS supplied to the power supply terminals in an embodiment of the disclosure. The power supply potentials VDDQ and VSSQ supplied to the power supply terminals may be different potentials from the power supply potentials VDD and VSS supplied to the power supply terminals in another embodiment of the disclosure. The power supply potentials VDDQ and VSSQ supplied to the power supply terminals are used for the input/output circuit 122 so that power supply noise generated by the input/output circuit 122 does not propagate to the other circuit blocks.

Figure 2:
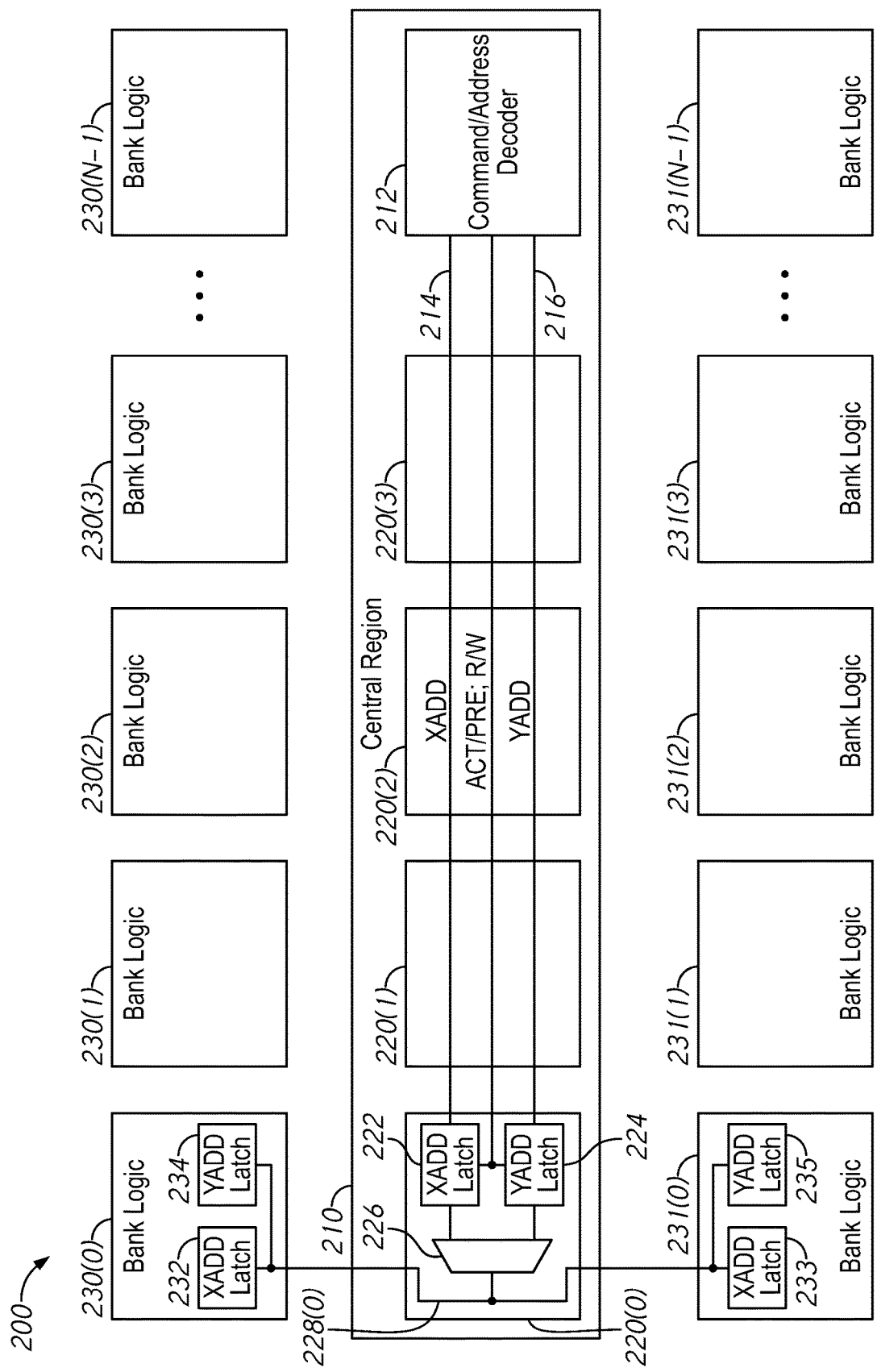
FIG. 2 is a block diagram of a layout of a memory device according to some embodiments of the present disclosure.

FIG. 2 is a block diagram of a layout of a memory device according to some embodiments of the present disclosure. The memory device 200 of FIG. 2 may, in some embodiments, implement the memory device 100 of FIG. 1. FIG. 2 shows a simplified layout diagram of a memory device 200 which shows the general organization of certain components and signal lines.

The memory device 200 includes a number of bank logic regions 230 and 231 (e.g., 140 of FIG. 1) each of which is associated with a memory bank (not shown in FIG. 2). The bank logic regions 230 may be generally arranged in a first row and the bank logic regions 231 may be generally arranged in a second row, with a central logic region 210 (e.g., 130 of FIG. 1) positioned between the two rows. For the sake of explanation, the direction along the rows of memory bank logic regions 230 and 231 may generally be referred to as 'horizontal', while the direction perpendicular (e.g., between two corresponding banks such as 230(0) and 231(0)) may generally be referred to as vertical. The central logic region 210 includes a command/address decoder 212 (e.g., 104 and 106 of FIG. 1, here shown as a single box) which provides row addresses XADD along a row address bus 214 and column addresses YADD along a column address bus 216. The row and column address buses 214 and 216 may each include a number of conductive elements, generally elongated along the horizontal direction to carry the bits of the row address and column address respectively. For example, the row address may be a 17 bit value and the row address bus 214 may be 17 bits wide (e.g., 17 conductive elements). The column address may be a 7 bit value, and the column address bus 216 may be 7 bits wide (e.g., 7 conductive elements). More or fewer bits for the row and/or column address and their respective buses may be used in other example embodiments. The command/address decoder also provides various commands such as row activation and precharge commands ACT/PRE and read/write commands R/W.

The central logic region 210 also includes a number of central address logic circuits 220, each of which is associated with a bank group. Each bank group includes two banks 230 and 231 on opposite sides of the central logic region 210. Each set of central address logic circuits 220 may receive the row address XADD from the row address bus 214, the column address from the column address bank 216 and distribute them along a shared address bus 228 to the bank logic regions 230 and 231 of the associated bank group. For the sake of simplicity, details are only shown for a single example bank group (bank group 0) including bank logic 230(0), bank logic 231(0), central address logic circuit 220(0), and shared address bus 228(0). However, each of the described components may be repeated for the bank groups 0 to N-1.

The central address logic circuits 220 includes a central row address latch 222 coupled to the row bus 214 and a central column address latch 224 coupled to the column address bus 216. Responsive to bank address signals which indicate the associated bank group, the central row address latch 222 may latch the row address XADD from the row address bus 214 and the central column address latch 224 may latch the column address YADD from the column address bus 216.

A multiplexer 226 provides the row address XADD in the central row address latch 222 onto a shared address bus 228(0) or provides the column address YADD in the central column address latch 224 onto the shared address bus 228(0). The shared address bus 228 may include a number of conductive elements which generally extend in a vertical direction (e.g., between the bank logic regions 230 and 231). The shared address bus 228 may include fewer conductive elements than the total number of bits of the row and the column address combined. The row and column addresses may be provided onto the shared bus at different times. For example, the multiplexer 226 may provide the row address to the shared bus at a first time and the column address to the shared address bus at a second time.

The timing at which the row and column address are provided along the shared bus 228 may be based, in part, on signals from the command/address decoder 212. For example, the row address may be provided based on a row activation signal ACT, and the column address may be provided based on the read/write signals R/W. Bank address latches 232 and 234 in bank logic 230 or latches 233 and 235 in bank logic 231 may latch the row address and column address respectively from the shared bus. For example, latches 232 and 233 may be bank row address latches and latches 234 and 235 may be bank column address latches. The latches 222 and 232/233 may similarly act on timing based on the row activation signal ACT while the latches 224 and 234/235 may act on timing based on the read/write commands R/W.

Since the shared address buses 228 may convey both the row and the column address, there may be a reduced number of conductive elements in the shared bus 228 compared to the row and column address buses 214 and 216. For example, if the row address bus 214 has a first number of conductive elements (e.g., 17) and the column address bus 216 has a second number of conductive elements (e.g., 7), then the shared address buses 228 may each have a third number of conductive elements which is less than a sum of the first and the second number of elements (e.g., fewer than 24 conductive elements). In some embodiments, the shared address buses 228 may each have a number of conductive elements which match a number of bits in the larger of the row address or column address (which may generally be the row address). Accordingly, the shared address buses 228 may have a number of conductive elements which match a number of conductive elements in the row or the column address bus (e.g., may generally match the number in the row address bus). For example, the shared address buses 228 may each have 17 conductive elements, all of which are used when the row address is provided and 7 of which are used when the column address is provided. In some embodiments, the row and column address buses 214 and 216 may extend in a first metal layer (e.g., M4) of the device, which may generally be used for horizontal buses. The shared address buses may extend in a second metal layer (e.g., M3) of the device, which may generally be used for vertical buses.

Figure 3:
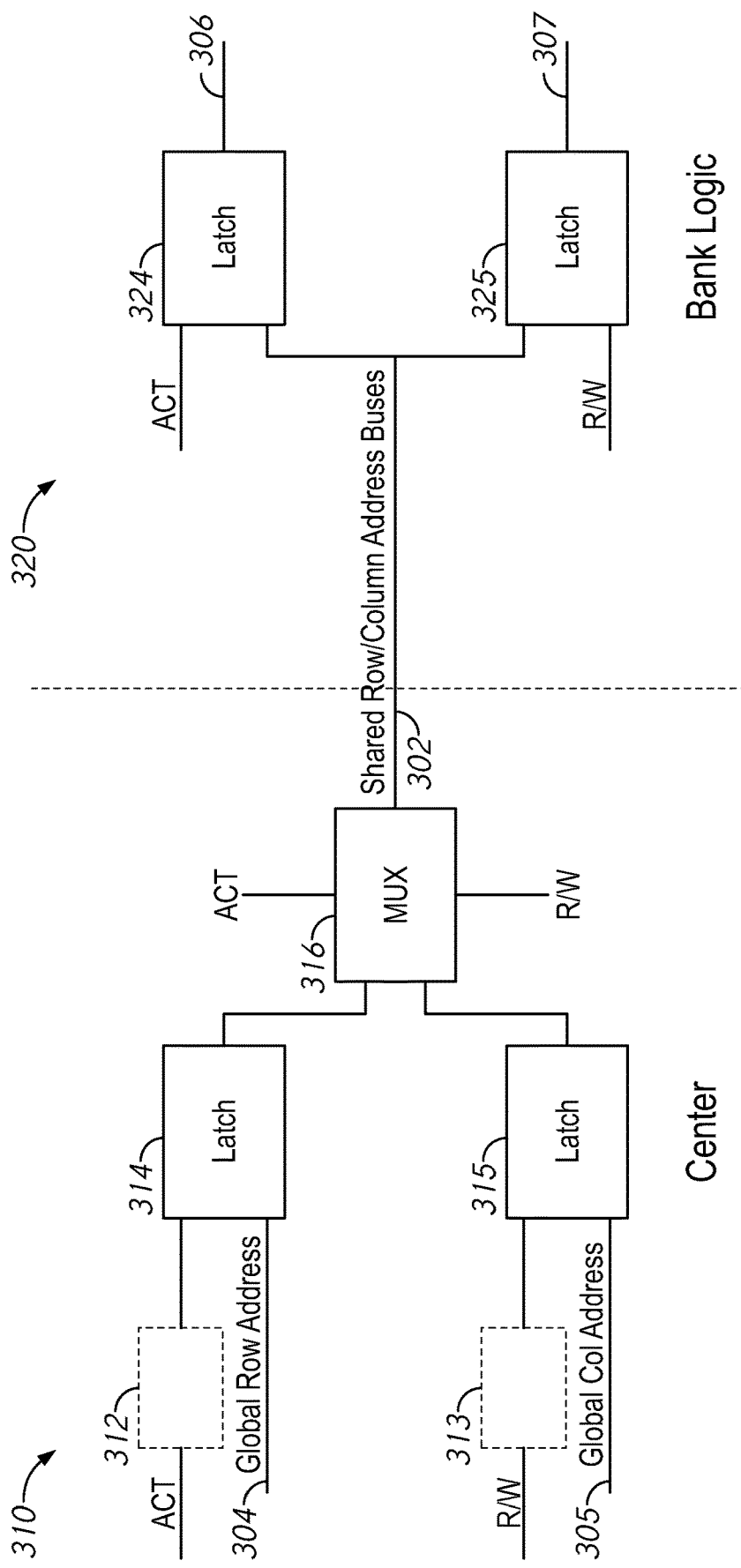
FIG. 3 is a block diagram of address latches according to some embodiments of the present disclosure.

FIG. 3 is a block diagram of address latches according to some embodiments of the present disclosure. FIG. 3 may, in some embodiments, implement a portion of a memory device such as 100 of FIGS. 1 and/or 200 of FIG. 2. The view of FIG. 3 shows a central logic region 310 (e.g., which may implement all or part of a central address logic region 220 of FIG. 2) and an associated portion bank address region 320 (e.g., 230 or 231 of FIG. 2). The central region and bank logic region are coupled by a shared address bus 302 (e.g., 228 of FIG. 2).

The central logic region includes a central row address latch 314 (e.g., 222 of FIG. 2) coupled to a global row address bus 304 (e.g., 214 of FIG. 2) and a central column address latch 315 (e.g., 224 of FIG. 2) coupled to a global column address bus 305 (e.g., 216 of FIG. 2). The central row address latch 314 latches the value on the global row address bus 304 based on the signal ACT. In some embodiments, the signal ACT may directly be used. In some embodiments, optional row address timing logic 312 may generate a command signal based on ACT and the command signal may be used for the timing of the latch 314. Similarly, the central column address latch 315 latches the value on the global column address bus 305 based on the signal R/W. In some embodiments, the signal R/W may directly be used. In some embodiments, optional column address timing logic 313 may generate a second command signal based on R/W and the second command signal may be used for the timing of the latch 315.

The central logic 310 also includes a multiplexer, which provides either the value in the row address latch 314 or the value in the column address latch 315 to the shared address bus 302. The multiplexer may operate with timing based on ACT and R/W and/or may act with timing based on the first and the second command signals from the row and column timing logic circuits 312 and 313.

For example, when ACT is active but R/W is not, the row address may be provided by the multiplexer 316 from the latch 314 along the shared address bus 302. When the signals ACT and R/W are both active, the column address may be provided by the multiplexer 316 from the latch 315 along the shared address bus 302.

In the bank logic region 320, a row address latch 324 may latch the value along the shared address bus 302 and then provide the latched value along a bank row address bus 306. The bank row address bus may couple the row address to components such as the row decoder (e.g., 108 of FIG. 1). A column address latch 325 may latch the value along the shared address bus 302 and then provide the latched value along a bank column address bus 307. The bank column address bus 307 may couple the column address to components such as the column decoder (e.g., 110 of FIG. 1). Similar to the latches 314 and 315, the latches 324 and 325 may operate with timing based on ACT and R/W respectively (or signals derived therefrom).

The value of the row address along the global row address bus 304 may vary with timing based on tRRD, a specification which defines a minimum row-to-row delay for a given bank. The value of the column address along the global column address bus 305 may vary with timing based on tCCD, a specification which defines a minimum column-to-column delay for a given bank. Accordingly, the values along the shared address bus 302 may vary based on tRCD, a specification which defines a minimum row-to-column delay time for a given bank group.

Figure 4:
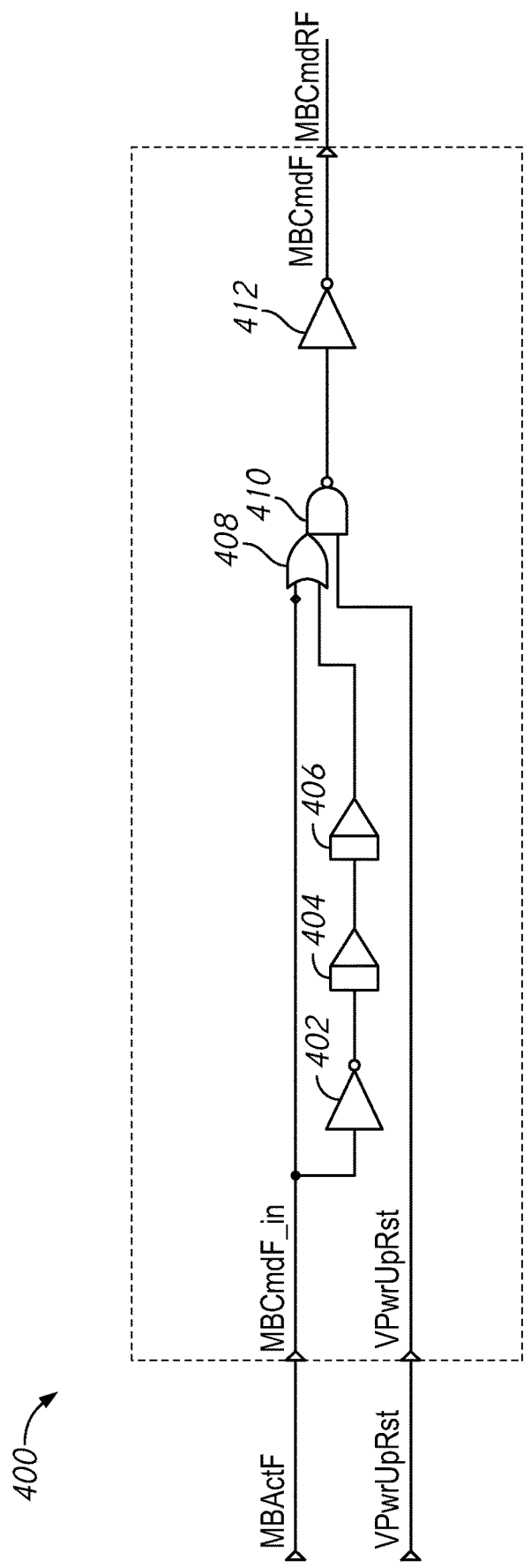
FIG. 4 is a schematic diagram of address timing logic according to some embodiments of the present disclosure.

FIG. 4 is a schematic diagram of address timing logic according to some embodiments of the present disclosure. The address timing logic 400 may, in some embodiments, implement the row address timing logic 312 of FIG. 3 and/or the column address timing logic 315 of FIG. 3. In some embodiments, the row and column address timing logic may be structurally similar to each other. For example, the components shown as the address timing logic 400 may be duplicated, once for the row address timing logic and once for the column address timing logic.

The address timing logic 400 receives an input signal (e.g., either ACT or R/W) and provides a command signal MBCmdRF or MBCmdCF respectively based on that input signal. The components of FIG. 4 will generally be discussed with respect to a row address timing logic circuit 400 which receives the row activation signal ACT as an input and provides a row command signal MBCmdRF as the command signal. However, the components and features described herein may also be repeated and used for the column timing logic but with R/W as the input and MBCmdCF as the output command signal.

An OR gate 408 receives an inverse the row activations signal ACT MBActF at one of its input terminals. The signals MBActF is logically complementary to the signal ACT. Accordingly, when ACT is at a high logical level, MBActF is at a low logical level. The other input terminal of the OR gate 408 is also coupled to the signal MBActF, but through a number of delay circuits 402-406. Each delay circuit may receive an input signal at a first time and provide that signal at a second time, wherein the first and second time are separated by a delay time. Since the signal MBActF may be high when ACT is inactive, when ACT becomes active, the signal MBActF will go low, but the output of the OR gate 408 will not become low until after the delay time added by the delay circuits 402-406.

The output of the OR gate 408 is coupled to an input of a NAND gate 410. The other input of the NAND gate is coupled to a power up/reset signal VPwrUpRst. The signal VPwrUpRst may be at a low logical level when the device is going through a power or reset cycle, and high otherwise. The output of the NAND gate 410 is provided through an inverter 412, which provides the output command signal MBCmdRF. Accordingly, if the device is being powered up or reset, then the output signal MBCmdF will be a logical low. If the device is not being powered up or reset, then the output signal MBCmdF may follow MBActF and become a logical low when MBActF first becomes active (e.g., falls to a low logical level) but may remain at a low logical level for a delay time based on the delay circuits 402-406 when the signal MBActF returns to an inactive level (e.g., rises to a logical high). When MBActF is inactive (e.g., at a high logical level), the output MBCmdRF may generally also remain at a high logical level.

If the address logic 400 is used for the column address timing logic, then the signal MBActF may be replaced with a signal MBColF as the input, where MBColF is based on the read or write command R/W and is active at a low logical level.

Figure 5:
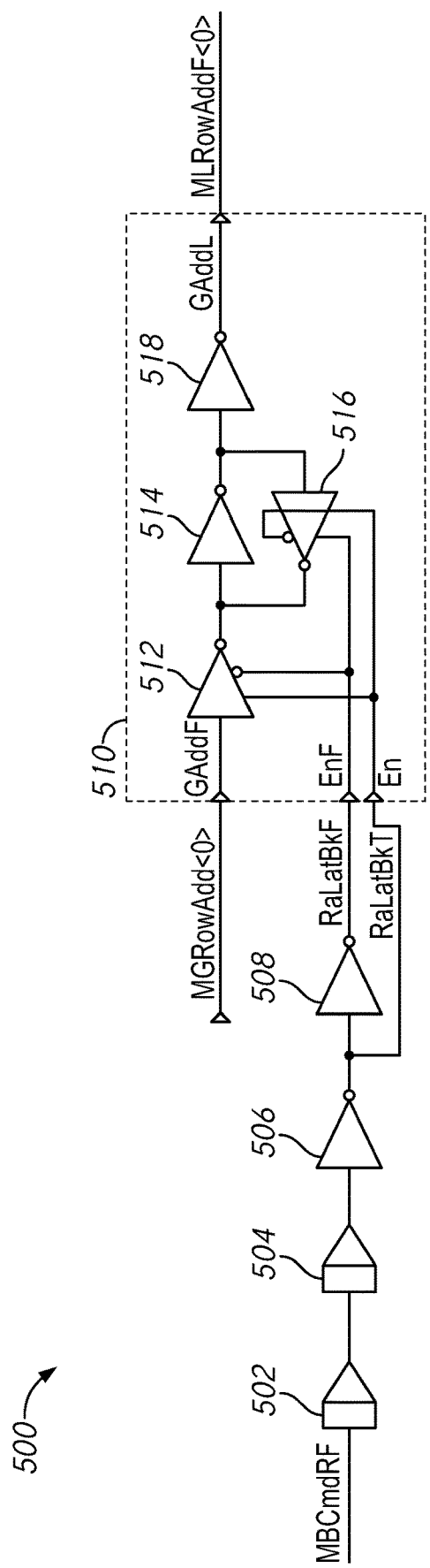
FIG. 5 is a schematic diagram of an address latch according to some embodiments of the present disclosure.

FIG. 5 is a schematic diagram of an address latch according to some embodiments of the present disclosure. The address latch 500 may, in some embodiments, implement one or more of the latches 232-235 of FIGS. 2 and/or 314/315 of FIG. 3. Similar to the address timing logic of FIG. 5, the components shown with respect to the address latch 500 of FIG. 5 may implement either the row address latch or the column address latch and in some embodiments, the components shown in FIG. 5 may be repeated one for the row and one for the column.

FIG. 5 will generally be described with respect to a row address latch, which receives a row command signal MBCmdRF from row timing logic (e.g., 400 of FIG. 4) and latches a bit of a row address MGRowAdd<0> (e.g., XADD) from a global row address bus and provides that bit as MLRowADDF<0> to a multiplexer. However, the components of FIG. 5 could also work as an example column address latch with a column command signal MBCmdCF from column timing logic which latches a bit of a column address MGColAdd<0> from a global column address bus and provides that bit as MLColAddF to a multiplexer.

The row address latch 500 shows a box 510 which represents the latch circuit which stores a bit of the address. The components of the box 510 may be repeated for each bit of the address.

The address latch 500 receives the row command signal MBCmdRF from the address timing logic circuit 400 of FIG. 4. The row command signal MBCmdRF is passed through two delay circuits 502 and 504 and an inverter 506 to generate a signal RaLatBkT which is complementary to the command signal MBCmdRF. Since the command signal MBCmdRF is active low, the signal RaLatBkT may be active high. The signal RaLatBkT is also passed through another inverter 508 to generate a complementary signal RaLatBkF.

The signal RaLatBkT is provided to an enable terminal En of the latch circuit 510, while the signal RaLatBkF is provided to an inverting enable terminal EnF of the latch circuit 510. When the signal RaLatBkT is at a logical high (e.g., because MBCmdRF is low) the latch circuit 510 will pass a bit from the global row address bus (in this case the first bit MGRowAdd<0>).

A particular arrangement of components are shown as the latch circuit 510, however it should be understood that other types of latch circuit may be used in other example embodiments. The latch circuit 510 has an input terminal which is coupled to the input of an inverter 512. The inverter 512 is active when the signal coupled to the enable terminal En is active, and the signal coupled to EnF is inactive. The inverter 512 is coupled to a pair of cross-coupled inverters 514 and 516. The inverter 516 is active when the signal on En is low and the signal on EnF is a logical high. The cross-coupled inverters 514 and 516 latch the value provided by the inverter 512 and provide the latched value through the inverter 518 to provide the output bit MLRowAddF<0>.

Figure 6:
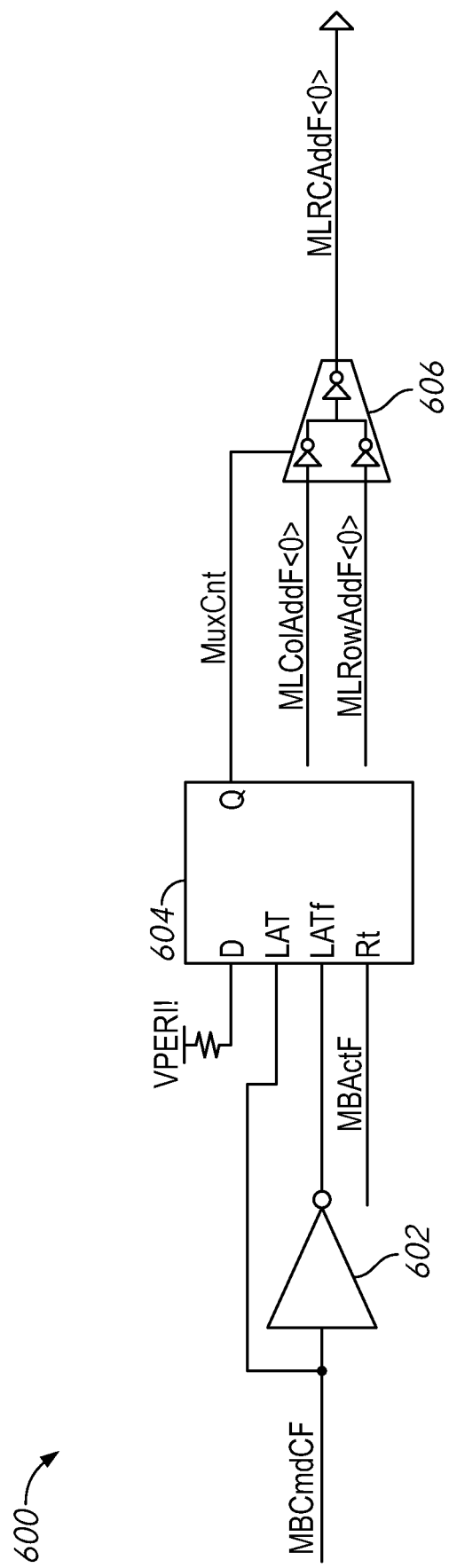
FIG. 6 is a schematic diagram of a multiplexer according to some embodiments of the present disclosure.

FIG. 6 is a schematic diagram of a multiplexer according to some embodiments of the present disclosure. The multiplexer 600 may, in some embodiments, be used to implement the multiplexer 226 of FIGS. 2 and/or 316 of FIG. 3. The multiplexer 600 may receive command signals such as MBCmdRF and MBCmdCF from row and column timing logic circuits such as the example timing circuit 400 of FIG. 4. The multiplexer 60) may additionally receive the signal MBActF (the complementary signal to ACT) which may be used to control the behavior of the multiplexer 600.

The multiplexer 600 includes a multiplexer circuit 606 which provides either a bit of the column address MLColAddF<0> from a column address latch (such as 500 of FIG. 5) or a bit of the row address MLRowAddFC0> from a row address latch (such as 500 of FIG. 5) along a conductive element of the shared address bus as the bit MLRCAddF<0>. The multiplexer circuit 606 is controlled by a multiplexer control signal MuxCnt provided by a latch 604. When the signal MuxCnt is active, the column address bit MLColAddF is provided to the shared address bus. When the signal MuxCnt is inactive, the row address bit MLRowAddF is provided to the shared address bus.

The latch 604 has a data terminal D coupled to a system voltage such as VPERI, which represents a logical high value. The latch 604 has a latch terminal LAT coupled to a column command signal MBCmdCF from the column timing logic. The signal MBCmdCF is also coupled through an inverter 602 to a complementary latch terminal LATf. A reset terminal of the latch 604 is coupled to MBActF. In some embodiments, the inverter 602 and the input terminal LATf may be removed.

Accordingly, when MBActF is at a high level (e.g., ACT is inactive) the latch 604 may be reset and the signal MuxCnt is at a low logical level, which may cause the row address to be provided on the shared address bus. When MBCmdCF becomes active (e.g., responsive to R/W becoming active) and when MBActF is at a logical low, the latch 604 provides MuxCnt at a high logical level and the column address bit is provided along the shared address bus. When the signal ACT becomes inactive again, the latch is reset 604.

Figure 7:
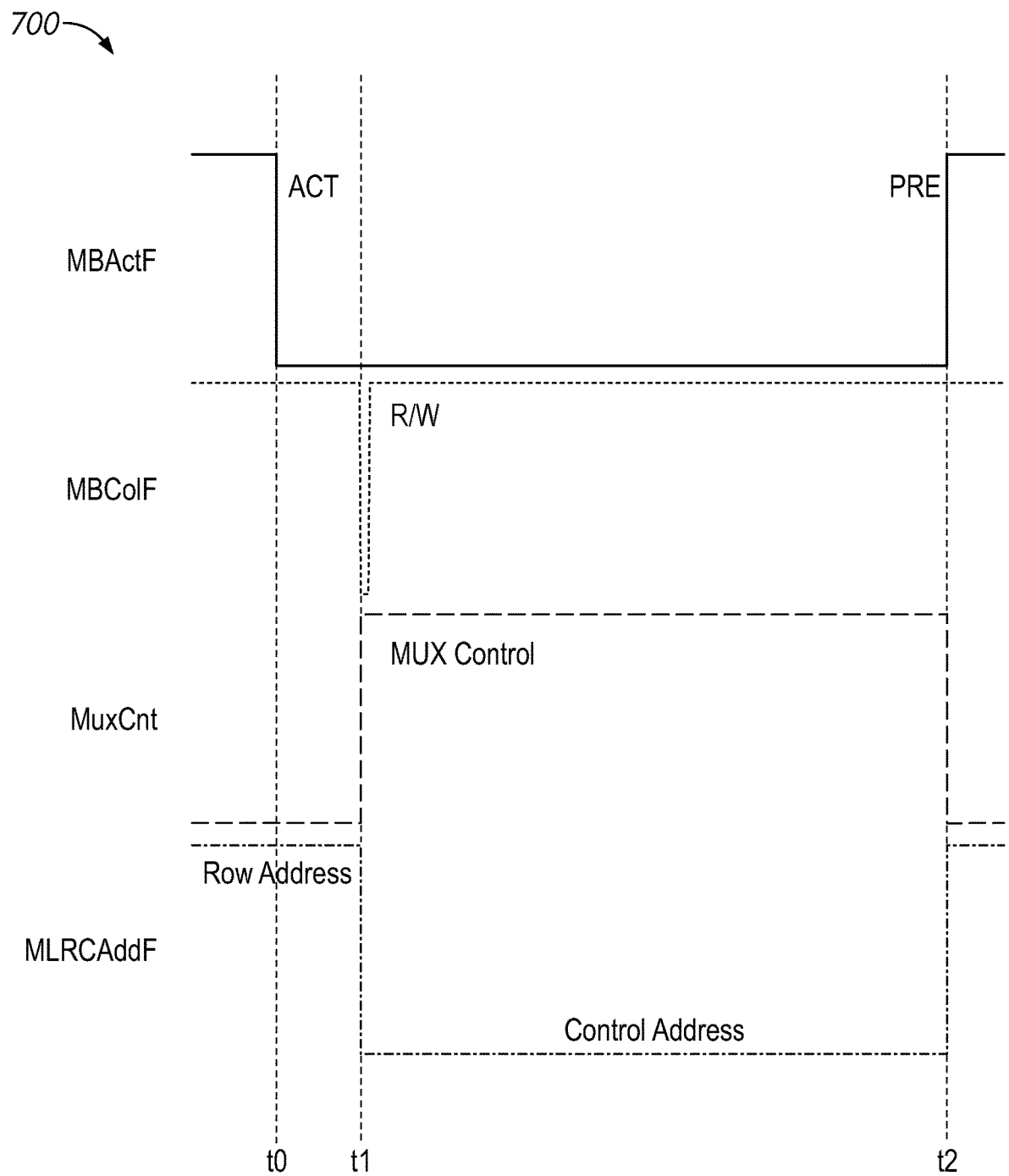
FIG. 7 is a timing diagram of an operation of signals related to a shared address bus according to some embodiments of the present disclosure.

FIG. 7 is a timing diagram of an operation of signals related to a shared address bus according to some embodiments of the present disclosure. The timing diagram may represent the operation of certain selected signals which are used to control which address is provided along a shared address bus such as 141 of FIG. 1, 228 of FIG. 2, and/or 302 of FIG. 3. In particular reference may be made to the signal names discussed with respect to FIGS. 5-7, however the operations of FIG. 7 may also be accomplished by other signals in other embodiments.

FIG. 7 shows a graph 700 which includes signals MBActF (e.g., the complement of ACT), MBColF (e.g., the complement of a R/W signal), a multiplexer control signal MuxCnt and a representation of an address along the shared address bus MLRCAddF. At an initial time t0, the row activation signal ACT becomes active, so the signal MBActF falls to a low logical level. The address provided along the shared row address bus is the row address since the multiplexer control signal is low. At a first time t0, there is a read/write command and a pulse of MBColF. This in turn causes the multiplexer control signal MuxCnt to become active, at which point the column address is provided along the shared address bus. At a second time t2 the signal ACT becomes inactive (e.g., responsive to a pre-charge command PRE) which causes MBActF to become active. This resets the multiplexer control signal MuxCnt to a low level which switches so the row address is provided along the shared address bus.

Figure 8:
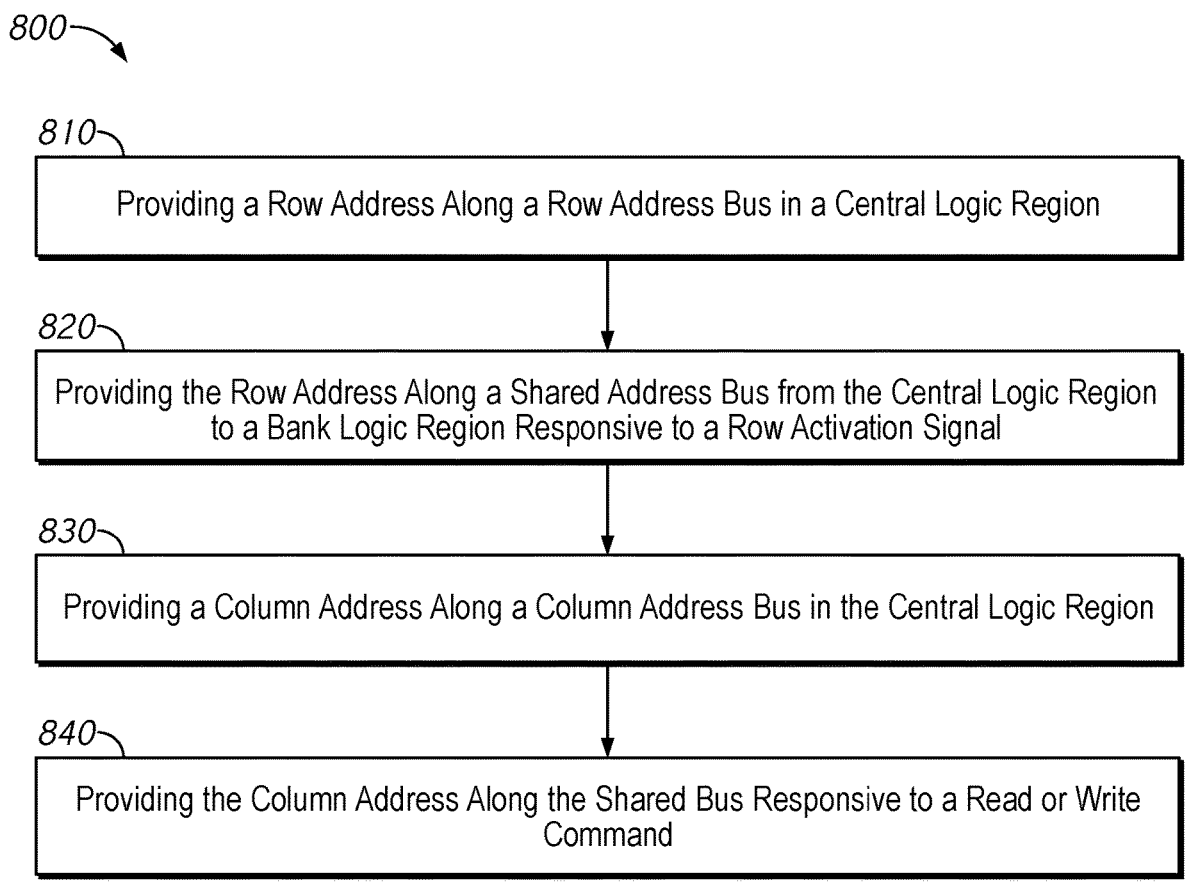
FIG. 8 is a flow chart of a method according to some embodiments of the present disclosure.

FIG. 8 is a flow chart of a method according to some embodiments of the present disclosure. The flow chart 800 may, in some embodiments be implemented by one or more of the apparatuses or systems disclosed herein, such as the memory device 100 of FIG. 1, 200 of FIG. 2, and/or the shared address bus logic described in one or more of FIGS. 3-6. The method 800 may be a method of using a shared address bus such as the shared address bus 141 of FIG. 1.228 of FIG. 2, and/or 302 of FIG. 3.

The method 800 may generally begin with box 810, which describes providing a row address along a row address bus (e.g., global row address bus 214 of FIGS. 2 and/or 304 of FIG. 3) in a central logic region. The method 800 also includes box 820, which describes Box 810 may generally be followed by box 820, which describes providing the row address along a shared address bus from the central logic region to a bank logic region responsive to a row activation signal. The method 800 may include latching the row address in a center row address latch (e.g., 222 of FIG. 2) responsive to the row activation signal (e.g., ACT or a signal derived from ACT such as MBActF or MBCmdRF). The method may involve coupling the center row address latch through a multiplexer to the shared address bus.

Box 820 may generally be followed by box 830, which describes providing a column address along a column address bus (e.g., global column address bus 216 of FIGS. 2 and/or 305 of FIG. 3) in the central logic region. The operations of boxes 810 and 820 may, in some embodiments, happen more or less simultaneously. For example, the times at which the global row address bus is providing the row address may overlap with at least a portion of the time at which the global column address bus is providing the column address bus. The row and column addresses may be provided along their respective buses responsive to an access operation such as a read or write operation, or may be provided due to an internal operation which activates the memory array such as a self-refresh operation. The method 800 may also include providing a row activation signal and then subsequently providing a read or write command.

Box 830 may generally be followed by box 840, which describes providing a column address along the shared bus responsive to a read or write command. The method 800 may include latching the column address in a center column address latch (e.g., 224 of FIG. 2) responsive to the read or write signal (e.g., R/W or a signal derived from R/W such as MBColF or MBCmdCF). The method may involve coupling the center column address latch through a multiplexer to the shared address bus.

The method 800 may include providing the row address along the shared address bus at a first time and providing the column address along the shared address bus at a second time after the first time. The method 800 may include providing the row address along a plurality of conductive elements which make up the shared address bus and providing the column address along at least a portion of the same plurality of conductive elements. For example the method 800 may include providing the row address along the plurality of conductive elements (e.g., 17 conductive elements) and providing the column address along less than all of the plurality of conductive elements (e.g., 7 of the 17 conductive elements).

The method 800 may include latching the row address in a bank row address latch (e.g., 232) in the bank logic region from the shared address bus and latching the column address in a bank column address latch (e.g., 234) in the bank logic region from the shared address bus. The method 800 may include using the row address and the bank address to access memory cells in a memory array of the bank.

It is to be appreciated that any one of the examples, embodiments or processes described herein may be combined with one or more other examples, embodiments and/or processes or be separated and/or performed amongst separate devices or device portions in accordance with the present systems, devices and methods.

Finally, the above-discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. An apparatus comprising:
   a plurality of memory banks;
   a first latch configured to receive a row address from a row address bus, wherein the row address is associated with a row of a memory bank of the plurality of memory banks;
   a second latch configured to receive a column address from a column address bus, wherein the column address is associated with a column of the memory bank of the plurality of memory banks, and wherein the first latch and the second latch are located in a central logic region;
   a multiplexer configured to provide the row address from the first latch at a first time and the column address from the second latch at a second time, wherein the row address and the column address are provided along a shared bus from the central logic region to a bank logic region of the memory bank;
   a third latch configured to receive the row address from the shared bus; and
   a fourth latch configured to receive the column address from the shared bus, wherein the third latch and the fourth latch are in the bank logic region of the memory bank.

2. The apparatus of claim 1, further comprising:
   a row decoder configured to activate a word line in the memory bank based on the row address in the third latch; and
   a column decoder configured to activate one or more bit lines in the memory bank based on the column address in the fourth latch.

3. The apparatus of claim 1, wherein the multiplexer is configured to provide the row address responsive to a row activation signal and wherein the multiplexer is configured to provide the column address responsive to a read or write signal.

4. The apparatus of claim 1, wherein the row address bus and the column address bus are located in the central logic region.

5. The apparatus of claim 1, wherein the shared bus has a number of conductive elements less than a number of bits in the row address plus a number of bits in the column address.

6. The apparatus of claim 1, further comprising a command/address decoder configured to provide the row address along the row address bus and the column address along the column address bus, wherein the command/address decoder is located in the central logic region.

7. An apparatus comprising:
a plurality of memory banks;
a bank logic region associated with a memory bank of the plurality of memory banks;
a central logic region including a row address bus and a column address bus;
a shared address bus coupling the central logic region to the bank logic region;
a multiplexer configured to selectively couple the row address bus or the column address bus to the shared address bus;
a first address latch configured to latch a row address off the row address bus, wherein the row address is associated with a row of the memory bank; and
a second address latch configured to latch a column address off the column address bus, wherein the column address is associated with a column of the memory bank, and wherein the multiplexer is configured to couple the row address from the first address latch to the shared address bus at a first time and the column address from the second address latch to the shared address bus at a second time.

8. The apparatus of claim 7, further comprising a command/address decoder configured to provide t row address along the row address bus and the column address along the column address bus.

9. The apparatus of claim 7, wherein the row address bus includes a first number of conductive elements, the column address bus includes a second number of conductive elements, and the shared address bus includes a third number of conductive elements, wherein the third number is less than a sum of the first number and the second number.

10. The apparatus of claim 9, wherein the third number is the lesser of the first number or the second number.

11. The apparatus of claim 7, wherein the multiplexer is configured to couple the row address bus to the shared address bus responsive to a row activation signal and configured to couple the column address bus to the shared address bus responsive to a read or write signal.

12. The apparatus of claim 7, further comprising:
a second bank logic region associated with a second memory bank;
a second shared address bus coupling the central logic region to the second bank logic region; and
a second multiplexer configured to couple the row address bus or the column address bus to the second shared address bus.

13. A method comprising:
providing a row address along a row address bus in a central logic region, wherein the row address is associated with a row of a memory bank of a plurality of memory banks;
providing, by a multiplexer, the row address along a shared bus from the central logic region to a bank logic region of the memory bank responsive to a row activation signal at a first time;
providing a column address along a column address bus in the central logic region, wherein the column address is associated with a column of the memory bank; and
providing, by the multiplexer, column address along the shared bus from the central logic region to the bank logic region responsive to a read or write command at a second time.

14. The method of claim 13, further comprising providing the row address along the row address bus and the column address along the column address bus responsive to an access operation.

15. The method of claim 13, further comprising:
selecting the row of the memory bank associated with the bank logic region based on the row address;
activating the selected row responsive to the row activation signal;
selecting the column the memory bank based on the column address; and
accessing the selected column responsive to the read or write command.

16. The method of claim 13 further comprising:
generating a multiplexer select signal which changes from a first level to a second level responsive to the read or write command and which resets to the first level responsive to a precharge command;
providing the row address to the shared bus with the multiplexer when the multiplexer select signal is at the first level; and
providing the column address to the shared address-bus with the multiplexer when the multiplexer select signal is at the second level.

17. The method of claim 16 further comprising:
latching the row address in a first address latch responsive to the row activation command;
latching the column address in a second address latch responsive to the read or write command; and
coupling the first address latch or the second address latch to the address bus with the multiplexer based on A state of the multiplexer select signal.

18. The method of claim 13, further comprising providing the row address along a plurality of conductive elements of the shared bus and providing the column address along less than all of the plurality of conductive elements.

19. The apparatus of claim 1, wherein the multiplexer is configured to receive a multiplexer control signal, wherein the multiplexer is configured to provide the row address along the shared bus when the multiplexer control signal is at an inactive level, and wherein the multiplexer is configured to provide the column address along the shared bus when the multiplexer control signal is at an active level.

* * * * *

UNITED STATES PATENT AND TRADEMARK OFFICE
CERTIFICATE OF CORRECTION

PATENT NO. : 12,346,586 B2
APPLICATION NO. : 18/480773
DATED : July 1, 2025
INVENTOR(S) : Hiroshi Akamatsu et al.

It is certified that error appears in the above-identified patent and that said Letters Patent is hereby corrected as shown below:

In the Claims

| | Reads | Should Read |
|---|---|---|
| Column 13, Line 37, Claim 8 | "configured to provide t row address" | --configured to provide the row address-- |
| Column 14, Line 13, Claim 13 | "providing, by the multiplexer, column address" | --providing, by the multiplexer, the column address-- |
| Column 14, Line 38, Claim 16 | "providing the column address to the shared address-bus" | --providing the column address to the shared address bus-- |
| Column 14, Line 47, Claim 17 | "with the multiplexer based on A state of the multiplexer select signal" | --with the multiplexer based on a state of the multiplexer select signal-- |

Signed and Sealed this
Twenty-eighth Day of October, 2025

John A. Squires
*Director of the United States Patent and Trademark Office*